(12) United States Patent
Richard et al.

(10) Patent No.: US 10,505,837 B1
(45) Date of Patent: Dec. 10, 2019

(54) METHOD AND APPARATUS FOR DATA RE-PACKING FOR LINK OPTIMIZATION

(71) Applicant: ALTERA CORPORATION, San Jose, CA (US)

(72) Inventors: Frederic Richard, Maidenhead (GB); Cristian Vasiliu, High Wycombe (GB); Robert Critchlow, Marlow (GB)

(73) Assignee: Altera Corporation, San Jose, CA (US)

( * ) Notice: Subject to any disclaimer, the term of this patent is extended or adjusted under 35 U.S.C. 154(b) by 296 days.

(21) Appl. No.: 13/938,179

(22) Filed: Jul. 9, 2013

(51) Int. Cl.
*H04L 12/707* (2013.01)

(52) U.S. Cl.
CPC .................... *H04L 45/22* (2013.01)

(58) Field of Classification Search
None
See application file for complete search history.

(56) References Cited

U.S. PATENT DOCUMENTS

| | | | | |
|---|---|---|---|---|
| 5,113,516 A * | 5/1992 | Johnson | ............... | G06F 7/785 341/60 |
| 5,469,544 A * | 11/1995 | Aatresh | ............... | G06F 13/4243 710/110 |
| 5,471,632 A * | 11/1995 | Gavin | ............... | G06F 13/4018 710/104 |
| 5,615,382 A * | 3/1997 | Gavin | ............... | G06F 13/4018 710/33 |
| 6,363,428 B1 * | 3/2002 | Chou | ............... | G06F 13/28 709/232 |
| 6,594,329 B1 * | 7/2003 | Susnow | ............... | G06F 1/12 375/372 |
| 7,003,059 B1 * | 2/2006 | Susnow | ............... | G06F 1/12 370/239 |
| 7,072,355 B2 * | 7/2006 | Kizer | ............... | H03M 9/00 370/250 |
| 7,359,994 B1 * | 4/2008 | Lakhanpal | ............... | H04L 43/18 702/108 |
| 7,366,803 B1 * | 4/2008 | Gaither | ............... | H04L 12/433 370/363 |
| 7,444,442 B2 * | 10/2008 | Dabral | ............... | G06F 13/28 710/22 |

(Continued)

OTHER PUBLICATIONS

Altera Corporation, "Avalon Interface Specifications," version 11.0, May 2011.

*Primary Examiner* — Gregory B Sefcheck
*Assistant Examiner* — Suk Jin Kang (57) ABSTRACT

One embodiment relates to a method of communicating a data packet stream in which data is re-packed to reduce wasted bandwidth. Data bytes of the data packet stream are received from a first data path and mapped to a second data path that is divided into a plurality of data segments. At least one data byte is mapped to each data segment until an end of, or pause in, the data packet stream. Another embodiment relates to a method of communicating data packets from multiple channels. Multiple data packet flows, each flow corresponding to a channel, is received on a first data path. The data bytes from the first data path are mapped to a second data path that is divided into multiple data segments. At least one data byte is mapped to each data segment until an end of, or pause in, the multiple data packet flows. Other embodiments, aspects, and features of the invention are also disclosed.

21 Claims, 11 Drawing Sheets

(56) References Cited

U.S. PATENT DOCUMENTS

| | | | | |
|---|---|---|---|---|
| 7,454,537 B1* | 11/2008 | Xue | G06F 5/06 | 710/52 |
| 7,573,916 B1* | 8/2009 | Bechtolsheim | H04L 12/4641 | 370/359 |
| 7,822,110 B1* | 10/2010 | Doblar | H04B 3/32 | 375/224 |
| 8,848,526 B1* | 9/2014 | Channabasappa | H04L 12/6418 | 370/230.1 |
| 2003/0002516 A1* | 1/2003 | Boock | H04L 7/02 | 370/412 |
| 2003/0016697 A1* | 1/2003 | Jordan | H04J 3/1617 | 370/466 |
| 2004/0170196 A1* | 9/2004 | Susnow | G06F 5/10 | 370/503 |
| 2004/0249964 A1* | 12/2004 | Mougel | H04J 3/062 | 709/231 |
| 2006/0092969 A1* | 5/2006 | Susnow | H04L 25/14 | 370/465 |
| 2007/0153831 A1* | 7/2007 | Kauschke | H04L 49/90 | 370/474 |
| 2007/0271535 A1* | 11/2007 | Hwang | G06F 13/4072 | 716/106 |
| 2008/0019389 A1* | 1/2008 | Barrass | H04L 47/10 | 370/463 |
| 2008/0089456 A1* | 4/2008 | Pasqualino | H04N 21/4342 | 375/356 |
| 2008/0155232 A1* | 6/2008 | Misra | G06F 9/30025 | 712/208 |
| 2008/0273602 A1* | 11/2008 | Glen | H04B 1/74 | 375/257 |
| 2010/0005214 A1* | 1/2010 | Trombley | G06F 13/405 | 710/310 |
| 2010/0005218 A1* | 1/2010 | Gower | G06F 13/4234 | 711/5 |
| 2010/0260055 A1* | 10/2010 | Anderson | H04L 29/06027 | 370/252 |
| 2011/0022719 A1* | 1/2011 | Anderson | H04L 29/06027 | 709/231 |
| 2011/0296078 A1* | 12/2011 | Khan | G06F 9/54 | 711/5 |
| 2012/0023252 A1* | 1/2012 | Helmke | H04L 25/14 | 709/231 |
| 2012/0124251 A1* | 5/2012 | Hnatko | G06F 13/28 | 710/29 |
| 2012/0204015 A1* | 8/2012 | Misra | G06F 9/3025 | 712/225 |
| 2012/0230373 A1* | 9/2012 | Hennedy | H04L 25/4908 | 375/219 |
| 2012/0230455 A1* | 9/2012 | Hennedy | H04L 25/14 | 375/354 |
| 2012/0290746 A1* | 11/2012 | Nagao | G06F 13/4027 | 710/33 |
| 2012/0303848 A1* | 11/2012 | Vallapaneni | G06F 13/364 | 710/110 |
| 2012/0320915 A1* | 12/2012 | Barrass | H04L 47/10 | 370/389 |
| 2013/0151796 A1* | 6/2013 | Gupta | G06F 13/12 | 711/154 |
| 2013/0195210 A1* | 8/2013 | Swarbrick | H04L 25/02 | 375/259 |
| 2013/0329558 A1* | 12/2013 | Kucharewski | H04L 47/22 | 370/235 |
| 2014/0005992 A1* | 1/2014 | Deindl | G06F 17/5027 | 703/4 |
| 2014/0029611 A1* | 1/2014 | Huang | H04L 49/25 | 370/389 |
| 2014/0056370 A1* | 2/2014 | Chang | H04L 25/14 | 375/259 |
| 2014/0325107 A1* | 10/2014 | Iwatsuki | G06F 1/10 | 710/124 |
| 2015/0304695 A1* | 10/2015 | Chen | H04L 5/0044 | 725/79 |
| 2015/0326504 A1* | 11/2015 | Yu | H04L 12/413 | 370/392 |

* cited by examiner

FIG. 3   300 data

|  | Cycle 3 | Cycle 2 | Cycle 1 |  |
|---|---|---|---|---|
| (i) | PKT2 (1) | PKT0 (5) | PKT0 (0) |  |
| (ii) | PKT3 (0) | PKT1 (0) | PKT0 (1) |  |
| (iii) | PKT3 (1) | PKT1 (1) | PKT0 (2) | 80 B |
| (iv) | PKT3 (2) | PKT1 (2) | PKT0 (3) |  |
| (v) | PKT3 (3) | PKT2 (0) | PKT0 (4) |  | control

|  | Cycle 3 | Cycle 2 | Cycle 1 |  |
|---|---|---|---|---|
| (i) | EOP2 ADR2 ERR2 MTY2 | EOP0 ADR0 ERR0 MTY0 | SOP0 ADR0 |  |
| (ii) | SOP3 ADR3 | SOP1 ADR1 | ADR0 |  |
| (iii) | ADR3 | ADR1 | ADR0 | 55 b |
| (iv) | ADR3 | EOP1 ADR1 ERR1 MTY1 | ADR0 |  |
| (v) | EOP3 ADR3 ERR3 MTY3 | SOP2 ADR2 | ADR0 |  |

FIG. 8   800 data

| Cycle 3 | Cycle 2 | Cycle 1 | |
|---|---|---|---|
| PKT0 (5) | PKT1 (0) | PKT0 (0) | (i) |
|  | PKT1 (1) | PKT0 (1) | (ii) |
|  | PKT2 (0) | PKT0 (2) | (iii) |
|  | PKT2 (1) | PKT0 (3) | (iv) |
|  | PKT0 (4) | PKT1 (0) | (v) | control

| Cycle 3 | Cycle 2 | Cycle 1 | |
|---|---|---|---|
| EOP0 ADR0 ERR0 MTY0 | ADR1 | SOP0 ADR0 | (i) |
|  | EOP1 ADR1 ERR1 MTY1 | ADR0 | (ii) |
|  | SOP2 ADR2 | ADR0 | (iii) |
|  | EOP2 ADR2 ERR2 MTY2 | ADR0 | (iv) |
|  | ADR0 | SOP1 ADR1 | (v) |

METHOD AND APPARATUS FOR DATA RE-PACKING FOR LINK OPTIMIZATION

TECHNICAL FIELD

The present invention relates generally to the transfer of data over a communication link.

DESCRIPTION OF THE BACKGROUND ART

Electronic components within a system may use serializer/de-serializer circuitry to transmit data by way of high-speed serial links. Such high-speed serial links allow for point-to-point data transfers to be made without the need to obtain access to a shared parallel bus.

In order to increase the available bandwidth of a point-to-point link, multiple serial lanes may be included in the link. The theoretically-achievable data rate of a multi-lane link may be computed by multiplying the number of lanes by the data rate of each lane. Hence, a link with eleven lanes at 12 gigabits per second (Gbps) per lane has a theoretically-achievable data rate of 132 Gbps.

SUMMARY

One embodiment relates to a method of communicating a data packet stream in which data is re-packed to reduce wasted bandwidth. Data bytes of the data packet stream are received from a first data path and mapped to a second data path that is divided into a plurality of data segments. At least one data byte is mapped to each data segment until the end of, or pause in, the data packet stream.

Another embodiment relates to an integrated circuit that includes a transmitter that has a data re-packing circuit module. The data re-packing circuit module maps the data bytes of a data packet stream from the internal data path to a segmented external data path. At least one data byte is mapped to each data segment until the end of, or a pause in, the data packet stream.

Another embodiment relates to a transceiver for data communications over a bi-directional link. The transceiver has a transmitter and a receiver. The transmitter includes a data re-packing module and the receiver includes a data un-packing module.

Another embodiment relates to a method of communicating data packets from multiple channels. Multiple data packet flows, each flow corresponding to a channel, is received on a first data path. The data bytes from the first data path are mapped to a second data path that is divided into multiple data segments. At least one data byte is mapped to each data segment until an end of, or pause in, the multiple data packet flows.

Other embodiments, aspects, and features are also disclosed.

DETAILED DESCRIPTION

Figure 1:
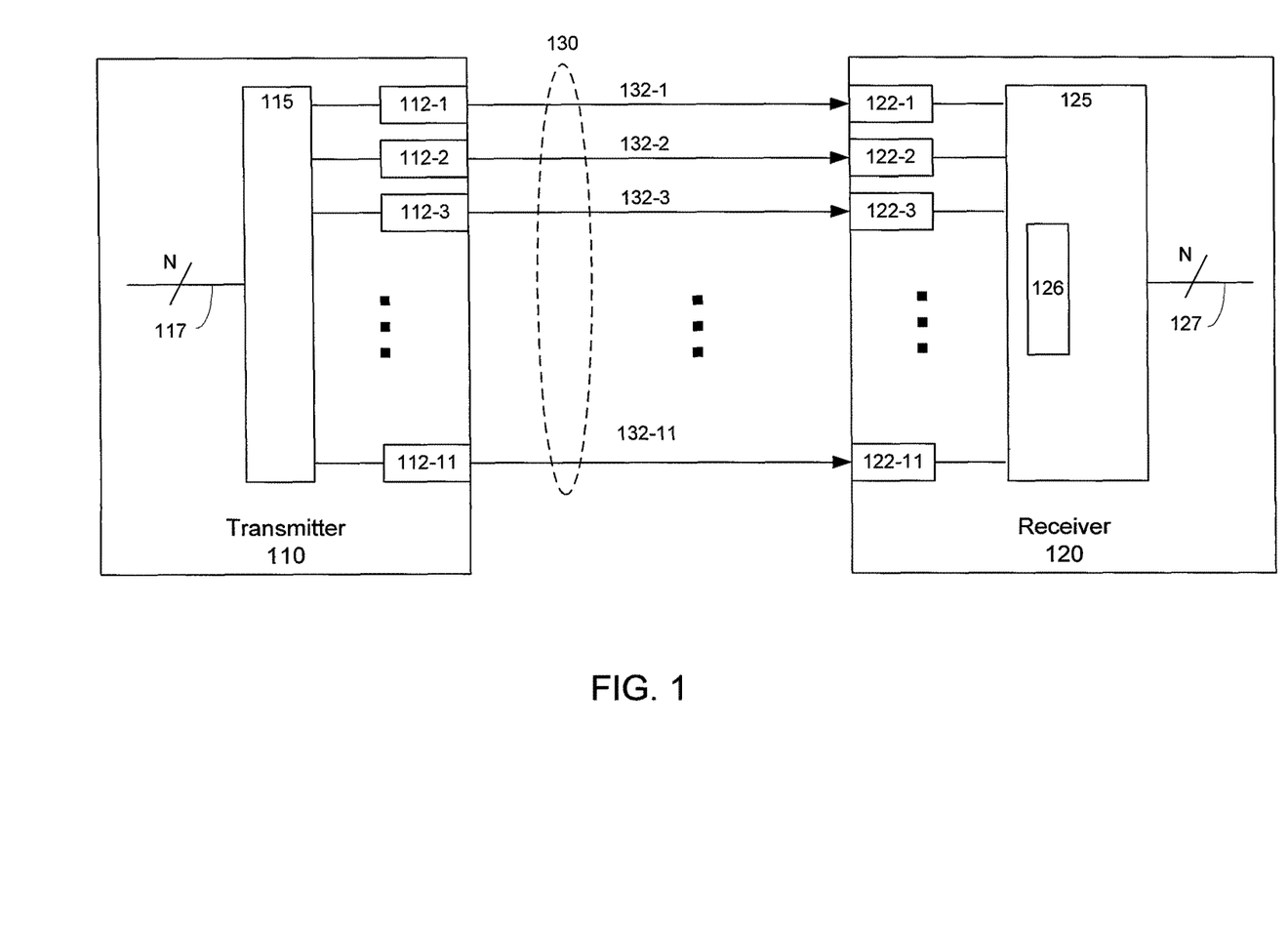
FIG. 1 depicts an exemplary point-to-point link in accordance with an embodiment of the present invention.

FIG. 1 depicts an exemplary point-to-point link 130 in accordance with an embodiment of the invention. As shown, the link 130 goes from a transmitter 110 to a receiver 120. As further shown, the link 130 may comprise multiple lanes, in this example, eleven lanes (132-1, 132-2, 132-3 . . . 132-11). Of course, other numbers of lanes may be implemented. The eleven lane structure in FIG. 1 is merely exemplary and not intended to limit the scope of the present invention.

In accordance with an embodiment of the invention, serial data may be received by a data re-packing circuit module 115 from an N-bit-wide internal data path 117 in the transmitter 110. The data re-packing circuit module 115 may perform the data packing method described below to re-arrange the data so as to pack the data into a more compact data structure for transmission over the link 130.

As depicted in FIG. 1, the link 130 may include, for example, eleven lanes. There may be a first transmission (TX) queue 112-1 for the serial data to be transmitted on the first lane 132-1, a second TX queue 112-2 for the serial data to be transmitted on the second lane 132-2, a third TX queue 112-3 for the serial data to be transmitted on the third lane 132-3, . . . , and an eleventh TX queue 112-11 for the serial data to be transmitted on the eleventh lane 132-11. Each TX queue 112 may be implemented as a first-in-first-out (FIFO) queue.

Correspondingly, at the receiver 120, there may be a first receiving (RX) FIFO buffer 122-1 for the serial data that is received on the first lane 132-1, a second RX FIFO buffer 122-2 for the serial data that is received on the second lane 132-2, a third RX FIFO buffer 122-3 for the serial data that is received on the third lane 132-3, . . . , and an eleventh RX FIFO buffer 122-11 for the serial data that is received on the eleventh lane 122-11. The receiver 120 may be configured to control the delay for each of the RX FIFO buffers 122 so as to deskew the serial data streams received on the multiple lanes such that the received data is aligned across the lanes.

In accordance with an embodiment of the invention, the multiple lanes of serial data may be provided by the RX FIFO buffers 122 to a data un-packing circuit module 125.

The data un-packing circuit module 125 may use an un-packing buffer 126 to perform the data un-packing method described below. The un-packed serial data may then be provided to an N-bit-wide internal data path 127 in the receiver 120.

Note that, while FIG. 1 shows a one-way link between a transmitter and a receiver, a multi-lane point-to-point link may also be bi-directional between two transceivers. In that case, each transceiver on either end of the link may include both a data re-packing circuit module 115 that performs the data packing method described below and a data un-packing circuit module 125 that performs the data un-packing method described below.

In another embodiment, instead of being used to transfer data between two separate devices, the data re-packing 115 and un-packing 125 circuit modules may be used to transfer data within a single device. For example, the data re-packing 115 and un-packing 125 circuit modules may be used to transfer data within an integrated circuit, such as, for example, a field programmable gate array (FPGA). Advantageously, such an embodiment may transfer data from one section of the integrated circuit to another section using less routing and generally at higher speed.

Figure 2:
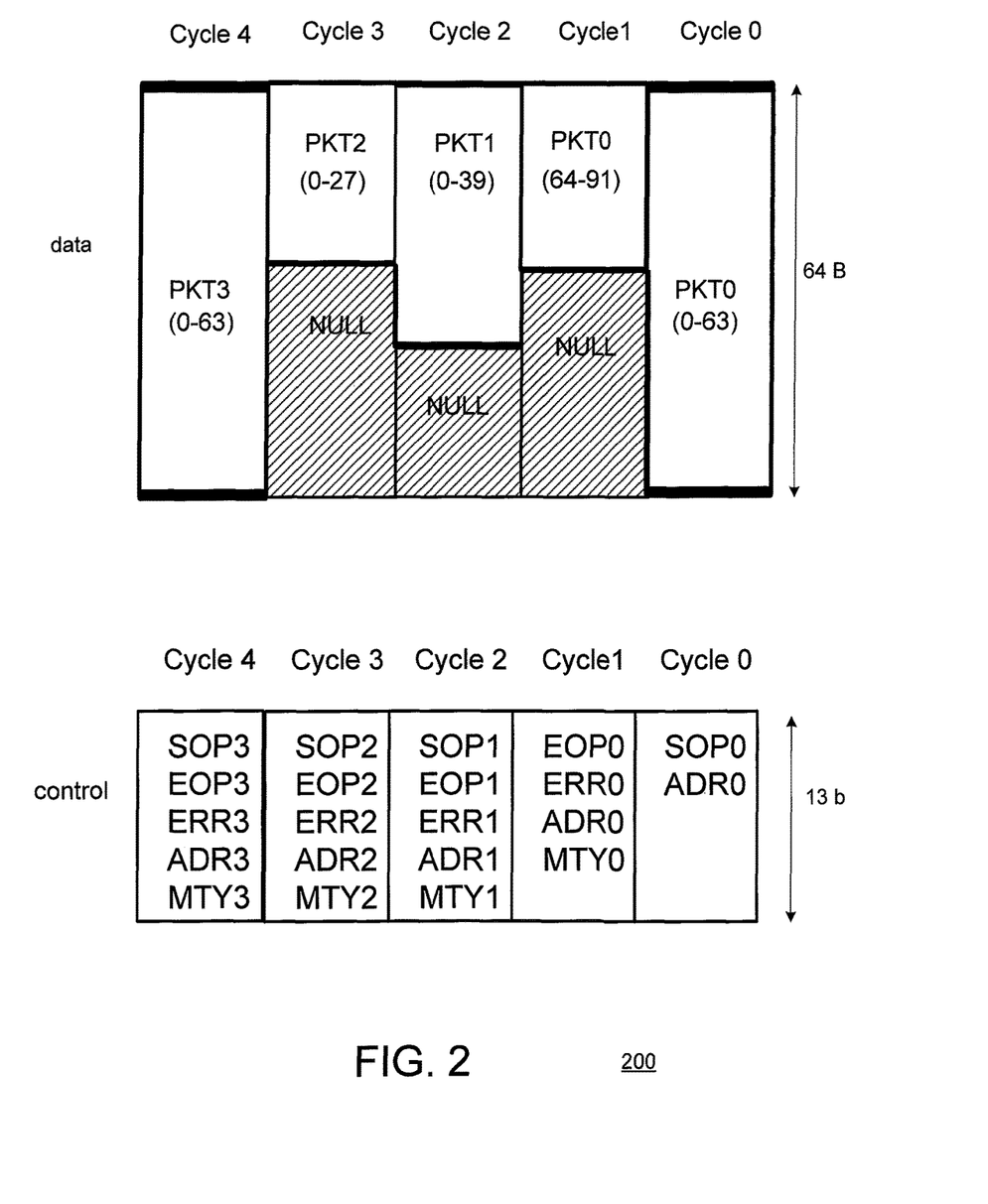
FIG. 2 is a diagram showing an example of a data packet stream received from a first data path in accordance with an embodiment of the invention.

FIG. 2 is a diagram showing an example of data packets received from a first data path in accordance with an embodiment of the invention. In this example, the first data path is an internal data path. This example is based on the Avalon® Streaming Interface (Avalon-ST) available from Altera Corporation of San Jose, Calif. While this example is based on Avalon-ST, the methods and apparatus disclosed herein for data re-packing and un-packing may also be applied to other types of protocols.

In this specific example, the width of the first data path is a total of 525 bits such that, in each cycle, 512 bits (64 bytes) of data and 13 bits of control signals are provided. The clock rate of the internal data path may be, for example, 295 megahertz (MHz). This equates to a total bandwidth, including empty data bytes, of 525 bits×295 MHz=155 gigabits per second (Gbps). The existence of empty (wasted) data bytes is shown in FIG. 2 and described below.

In this example, a first data packet (PKT0) may have 92 data bytes, a second data packet (PKT1) may have 40 data bytes, a third data packet (PKT2) may have 28 data bytes, and a fourth data packet (PKT3) may have 64 data bytes. As depicted in FIG. 2, four cycles (Cycle 0 through Cycle 3) are required to provide these four packets based on a conventional format. In the conventional format, each cycle is used to provide data bytes for one and only one packet. If a packet has more data bytes than can be provided in a single cycle, then the following cycle is used to provide the next data bytes for that packet.

Because PKT0 has 92 data bytes, two cycles (Cycle 0 and Cycle 1) are required to transmit PKT0. Cycle 0 provides the first 64 bytes (bytes 0-63) of PKT0. Cycle 1 provides the next 28 bytes (bytes 64-91) of PKT0. The remaining 36 bytes of Cycle 1 may be empty (NULL), as indicated by the diagonal patterning. The control bits for Cycle 0 include the start-of-packet indicator (SOP0) for PKT0 and an address (ADR0) for PKT0. The control bits for Cycle 1 include an end-of-packet indicator (EOP0) for PKT0, an error correction byte (ERR0) for PKT0, an address (ADR0) for PKT0, and an empty indication byte (MTY0) to indicate the number of empty data bytes (36, in this case) in Cycle 1.

Because PKT1 has 40 data bytes, only one cycle (Cycle 2) is needed for PKT1. Cycle 2 provides the 40 data bytes (bytes 0-39) of PKT1. The remaining 24 bytes of Cycle 2 may be empty (NULL), as indicated by the diagonal patterning. The control bits for Cycle 2 include the start-of-packet indicator (SOP1) for PKT1 and an address (ADR1) for PKT1. The control bits for Cycle 2 also include an end-of-packet indicator (EOP1) for PKT1, an error correction byte (ERR1) for PKT1, and an empty indication byte (MTY1) to indicate the number of empty data bytes (24, in this case) in Cycle 2.

Similarly, because PKT2 has 28 data bytes, only one cycle (Cycle 3) is needed for PKT2. Cycle 3 provides the 28 data bytes (bytes 0-27) of PKT2. The remaining 36 bytes of Cycle 3 may be empty (NULL), as indicated by the diagonal patterning. The control bits for Cycle 3 include the start-of-packet indicator (SOP2) for PKT2 and an address (ADR2) for PKT2. The control bits for Cycle 3 also include an end-of-packet indicator (EOP2) for PKT2, an error correction byte (ERR2) for PKT2, and an empty indication byte (MTY2) to indicate the number of empty data bytes (36, in this case) in Cycle 3.

Similarly, because PKT3 has 64 data bytes, only one cycle (Cycle 4) is needed for PKT3. Cycle 4 provides the entire 64 data bytes (bytes 0 to 63) of PKT3. The control bits for Cycle 4 include the start-of-packet indicator (SOP3) for PKT3 and an address (ADR3) for PKT3. The control bits for Cycle 4 also include an end-of-packet indicator (EOP3) for PKT3, an error correction byte (ERR3) for PKT3, and an empty indication byte (MTY3) to indicate the number of empty data bytes (zero, in this case) in Cycle 4.

As shown in FIG. 2 and described above, there may be a relatively large portion of the bandwidth that goes to waste when data packets are received from the first data path. In the particular example of FIG. 2, 96 bytes of the total 320 data bytes are wasted (empty). The present disclosure provides a data packing technique that advantageously reduces the amount of wasted bytes.

Figure 3:
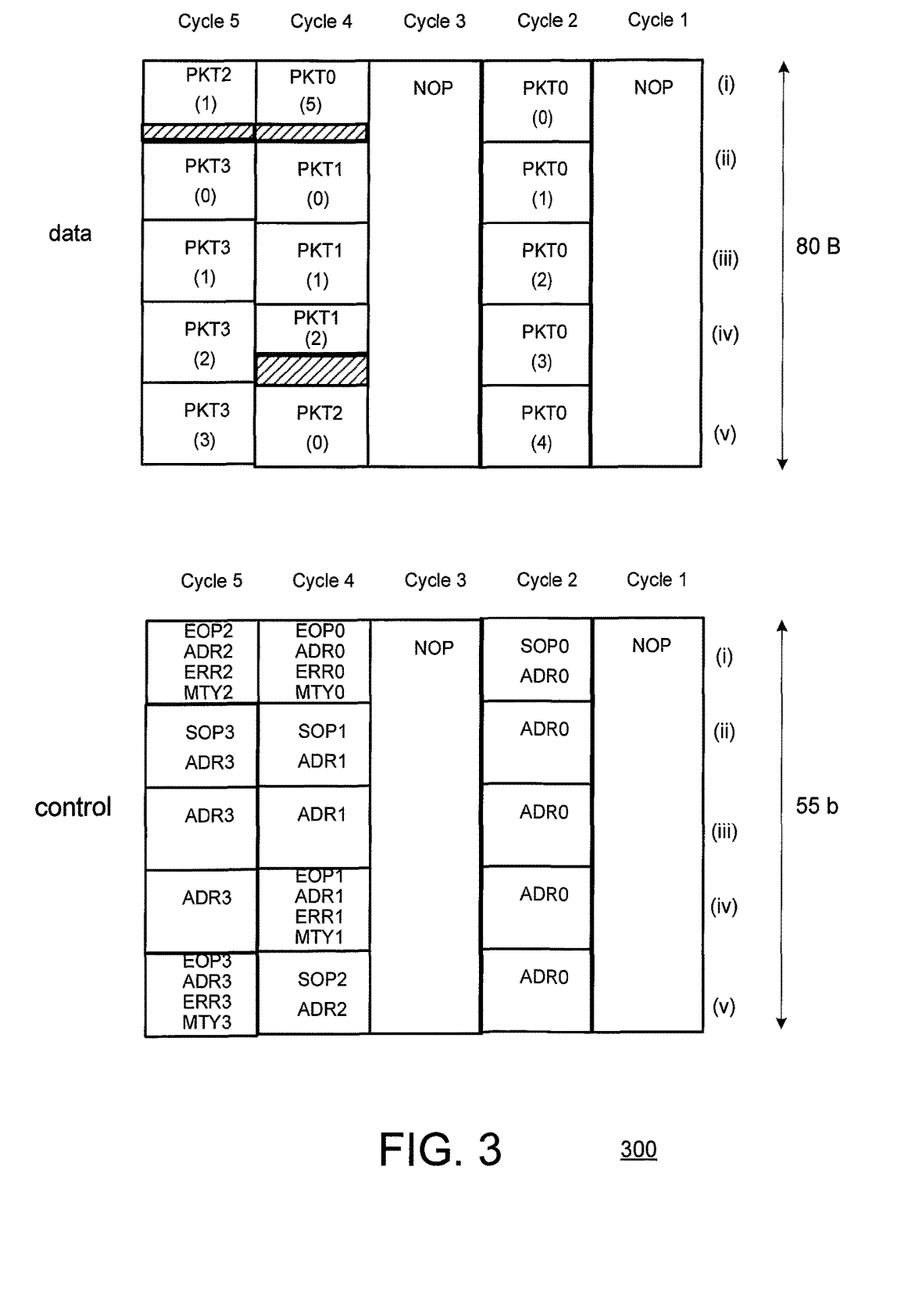
FIG. 3 depicts an exemplary intermediate packing state as generated for a second data path in accordance with an embodiment of the invention.
Figure 4:
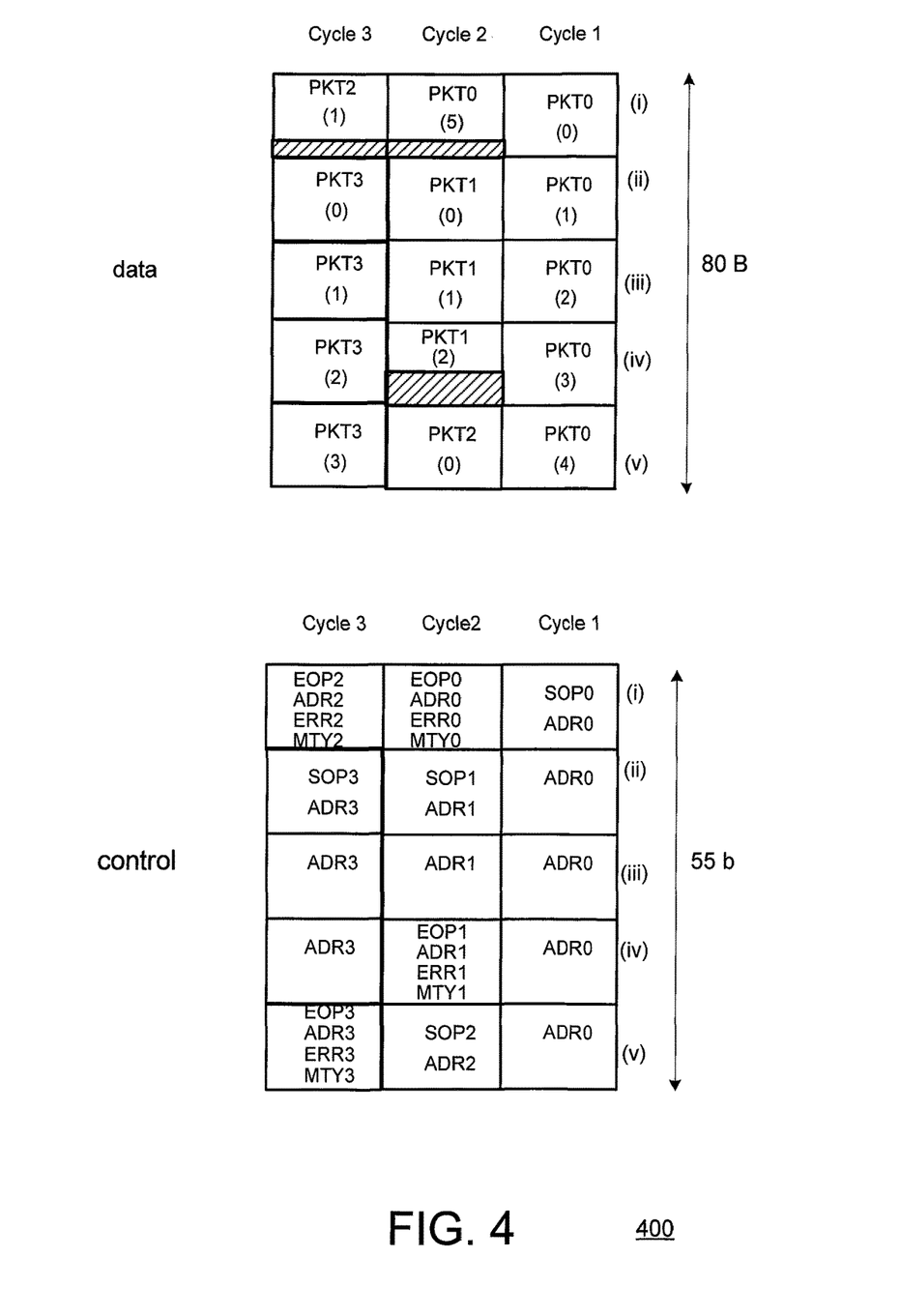
FIG. 4 depicts an exemplary final packing state to be output on the second data path in accordance with an embodiment of the invention.

FIG. 3 shows an example intermediate packing state 300, including packet transfer control signals, as may be generated in accordance with an embodiment of the invention. The intermediate packing state 300 may be generated by the data re-packing circuit module 115 at the clock rate of the first data path (for example, at the internal clock rate if the first data path is an internal data path within an integrated circuit). Similarly, FIG. 4 shows an example final packing state 400 that may be output in accordance with an embodiment of the invention. The final packing state 400 may be output at the clock rate of the second data path (for example, at the external clock rate if the second data path is an external data path between integrated circuits). The intermediate and final packing states (300 and 400) may have the same data path width and use the same number of control bits.

In accordance with an embodiment of the invention, the intermediate 300 and final 400 packing states may be each divided into multiple data segments. In the implementation shown in FIGS. 3 and 4, they are each divided into five data segments (segments i, ii, iii, iv, and v) of equal size. Other numbers of segments may be used in other implementations.

In accordance with an embodiment of the invention, every data segment is packed in sequential order with available data bytes from a single packet until the end of the data packet stream. In generating the intermediate packing state 300, if there would be one or more empty data segments in a cycle before the end of the data packet stream, then a no-operation (NOP) command is performed for that cycle so that further data bytes may be received so as to fill the empty data segment(s).

Note that once the data packet stream ends (i.e. once there is a pause or gap in the stream of data packets), then a cycle with one or more empty data segments may be allowed so as to prevent waiting for a long amount of time before sending remaining data segments. In one implementation, a time-out function may be used to detect an end (i.e. a pause or gap) of the data packet stream.

Four packets are received and mapped in the specific example depicted in FIGS. 2 through 4. As discussed above in relation to FIG. 2, the four packets (PKT0 with 92 data bytes, PKT1 with 40 data bytes, PKT2 with 28 data bytes, and PKT3 with 64 data bytes) are received in five cycles (Cycle 0 through Cycle 4) from the first data path.

As depicted in FIG. 3, the four packets are packed into five cycles (Cycle 1 through Cycle 5) in the intermediate packing state 300. In accordance with an embodiment of the invention, Cycle 1 is a NOP cycle because a last segment (segment v) would be empty due to only 64 bytes of PKT0 being received prior to the start of Cycle 1. The five segments (segments i through v) of Cycle 2 provide the first 80 bytes (bytes 0-79) of PKT0. Cycle 3 is a NOP cycle because a last segment (segment v) would be empty due to PKT 2 not yet being received. Cycle 4 provides the last 12 bytes (bytes 80-91) of PKT0 in the first segment (with 4 bytes empty in the first segment), the 40 bytes of PKT 1 in the second through fourth segments (with 8 bytes empty in the fourth segment), and the first 16 bytes of PKT2 in the fifth segment. Cycle 5 provides the last 12 bytes (bytes 16-27) of PKT2 in the first segment and the 64 bytes (bytes 0-63) of PKT3 in the second through fifth segments.

In accordance with an embodiment of the invention, the control bits may be divided into a same number of segments as the data bytes. In this case, since there are five data segments (segments i through v) per cycle for the data bytes, there may be five control segments (segments i through v) per cycle for the control bits. In one specific implementation, each control segment has eleven control bits as follows: SOP 1 bit; EOP 1 bit; ERR 1 bit; ADDR 4 bits; MTY 3 bits; and one parity bit. The present disclosure is not intended to be limited to these specific implementations. It is contemplated that various sizes and formats of the control field may be used.

As discussed above, Cycles 1 and 3 are NOP cycles for the data segments. This NOP status is reflected in the control bits for Cycles 1 and 3.

The first control segment (segment i) for Cycle 2 includes the start-of-packet indicator (SOP0) for PKT0 and an address (ADR0) for the corresponding data segment. The second through fifth control segments (segments ii through v) for Cycle 2 include addresses (ADR0) for the corresponding data segments. The first control segment (segment i) for Cycle 4 includes an end-of-packet indicator (EOP0) for PKT0, an error correction byte (ERR0) for PKT0, an address (ADR0) for the corresponding data segment, and an empty indication byte (MTY0) to indicate the number of empty data bytes in the corresponding data segment (4 empty bytes, in this instance).

The second control segment (segment ii) for Cycle 4 includes the start-of-packet indicator (SOP1) for PKT1 and an address (ADR1) for the corresponding data segment. The third control segment (segment iii) for Cycle 4 includes an address (ADR1) for the corresponding data segment. The fourth control segment (segment iv) for Cycle 4 includes an end-of-packet indicator (EOP1) for PKT1, an error correction byte (ERR1) for PKT1, an address (ADR1) for the corresponding data segment, and an empty indication byte (MTY1) to indicate the number of empty data bytes in the corresponding data segment (8 empty bytes, in this instance).

The fifth control segment (segment v) for Cycle 4 includes the start-of-packet indicator (SOP2) for PKT2 and an address (ADR2) for the corresponding data segment. The first control segment (segment i) for Cycle 5 includes an end-of-packet indicator (EOP2) for PKT2, an error correction byte (ERR2) for PKT2, an address (ADR2) for the corresponding data segment, and an empty indication byte (MTY2) to indicate the number of empty data bytes in the corresponding data segment (4 empty bytes, in this instance).

The second control segment (segment ii) for Cycle 5 includes the start-of-packet indicator (SOP3) for PKT3 and an address (ADR3) for the corresponding data segment. The third and fourth control segments (segments iii and iv) for Cycle 5 include an address (ADR3) for the corresponding data segments. The fifth control segment (segment v) for Cycle 5 includes an end-of-packet indicator (EOP3) for PKT3, an error correction byte (ERR3) for PKT3, an address (ADR3) for the corresponding data segment, and an empty indication byte (MTY3) to indicate the number of empty data bytes in the corresponding data segment (0 empty bytes, in this instance).

The final packing state 400 of FIG. 4 shows the packing state to be output from the data re-packing circuit module 115 to the TX buffers 112. As shown in FIG. 4, the final packing state 400 differs from the intermediate packing state 300 of FIG. 3 in that no-operation (NOP) cycles in the intermediate packing state 300 are removed. Hence, Cycles 1, 2 and 3 of the final packing state 400 correspond to Cycles 2, 4 and 5 of the intermediate packing state 300.

Advantageously, the data bytes are more compactly packed in FIG. 4, with less wasted bandwidth, than in FIG. 2. In the particular example of FIG. 4, only 16 bytes of the total 240 data bytes are wasted (empty). This compares with 96 of 320 data bytes being wasted in FIG. 2.

In one implementation, as depicted in FIG. 1, the second data path may be an external data path that involves eleven TX buffers 112-1 through 112-11 associated with eleven serial lanes 132-1 through 132-11 of the multi-lane link 130. In this implementation, ten of eleven lanes may be used to each transmit up to 8 data bytes per cycle for a total of up to 80 data bytes (640 data bits) per cycle. In addition, one of the eleven lanes may be used to transmit 8 control bytes (64 bits) per cycle, where 55 of the 64 control bits may be used. The clock rate for transmission over the second data path may be 189 MHz, for example. If the clock rate is 189 MHz, then the total bandwidth of the multi-lane link 130 is (640+64) bits×189 MHz=132 Gbps.

Note that the total bandwidth of the first data path may be greater than the total bandwidth of the second data path. For instance, in the specific example discussed above, the first data path may be an internal data path having a total bandwidth of 155 Gbps while the external data path may be an external data path having a total bandwidth of 132 Gbps. The lower bandwidth of the second data path is acceptable, in part, because of the more efficient packing structure disclosed herein.

Figure 5:
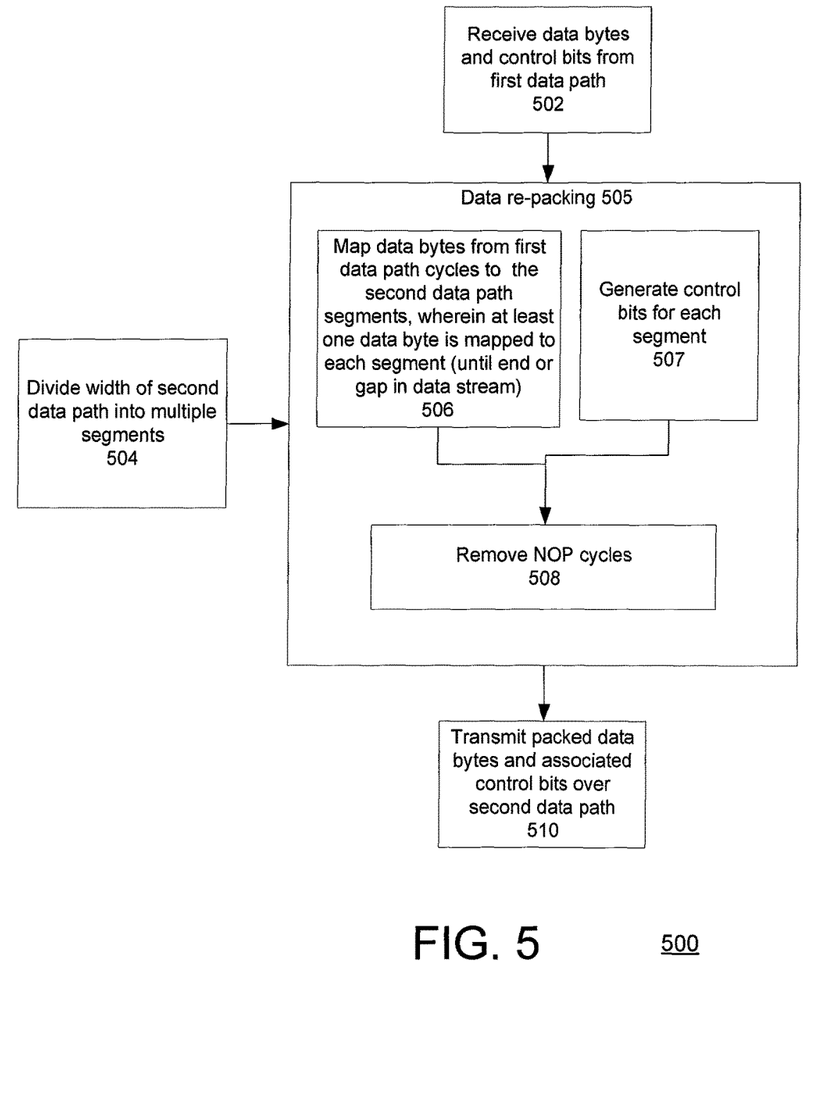
FIG. 5 is a flow chart of an exemplary method of data re-packing for link optimization in accordance with an embodiment of the invention.

FIG. 5 is a flow chart of an exemplary method 500 of data re-packing for link optimization in accordance with an embodiment of the invention. The method 500 may be performed, for example, by a data re-packing circuit module which is used to re-pack data from a first data path and provide the re-packed data to a second data path.

Per block 502, the data packet stream, including data bytes and control bits, may be received from the first data path. The control bits include packet transfer control signals. The packet transfer control signals may include a start-ofpacket signal, an end-of-packet signal, an error correction signal, and so on. For example, in one specific implementation, the first data path may be an internal data path that receives a data packet stream in the format described above in relation to FIG. 2. This disclosure is not intended to be limited to the specific size or format of the first data path described above in relation to FIG. 2. It is contemplated that various sizes and formats for the first data path may be used.

Per block 504, the width of the second data path may be divided into segments. In an exemplary implementation, the second data path may be a multi-lane link. For example, in one specific implementation, the width of the second data path may be an external data path that is segmented as described above in relation to FIGS. 3 and 4. Alternatively, the second data path may be an internal data path between sections within an integrated circuit. Note that this disclosure is not intended to be limited to the specific size or format of the second data path that is described above in relation to FIGS. 3 and 4. It is contemplated that various sizes and formats of the second data path may be used.

Per block 505, the data packing may be performed. The data packing may involve performing blocks 506, 507, and 508. Per block 506, the data bytes are mapped from the first data path cycles to the second data path segments. Per block 507, control bits for each segment are generated. For example, in one specific implementation, the mapping of the data bytes per block 506 and the generation of the control bits per block 507 may be performed, during receipt of a continuous packet stream, so as to go from the format described above in relation to FIG. 2 to the format described above in relation to FIG. 3. Subsequently, per block 508, no-operation (NOP) cycles may be removed, as described above in relation to FIG. 4.

Per block 510, the packed data bytes and associated control bits may be transmitted over the second data path. As described above in relation to FIG. 4, the packed data bytes may have substantially less wasted space compared to the data packet stream received from the first data path.

Figure 6:
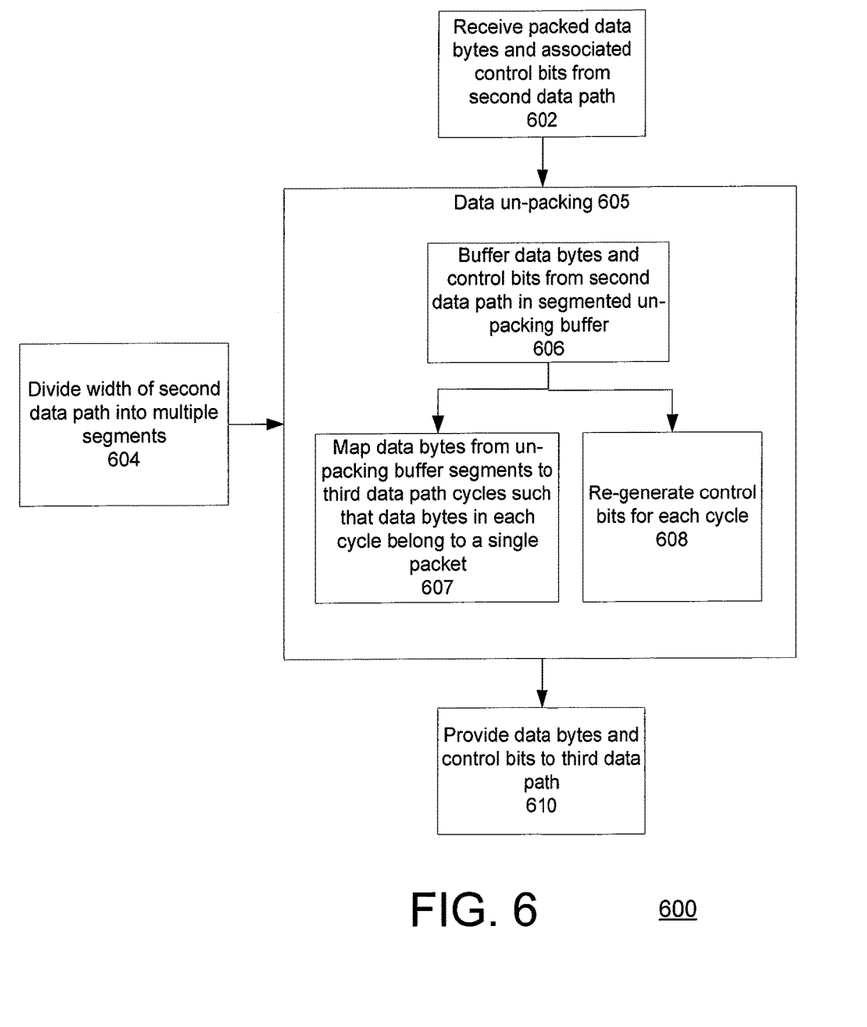
FIG. 6 is a flow chart of an exemplary method of data un-packing in accordance with an embodiment of the invention.

FIG. 6 is a flow chart showing an exemplary method 600 of data un-packing in accordance with an embodiment of the invention. The method 600 may be performed, for example, by a data un-packing circuit module which is used to receive data from the second data path described above in relation to FIG. 5. The method 600 provides un-packed data and control bits to a third data path. For example, the third data path may be of the same size and format as the first data path described above in relation to FIG. 5. Alternatively, the third data path may be of a different size and format than the first data path.

Per block 602, the packed data bytes and associated control bits may be received from the second data path. For example, in one specific implementation, the data packet stream may be received from the second data path in the format described above in relation to FIG. 4.

Per block 604, the width of the second data path may be divided into segments. The number of segments used per block 604 of FIG. 6 is the same as the number of segments used per block 504 of FIG. 5.

Per block 605, the data un-packing may be performed. The data un-packing may involve performing blocks 606, 607, and 608. Per block 606, the data and control segments from the second data path may be buffered in an un-packing buffer 126. The un-packing buffer 126 may be segmented in the same manner as the second data path is segmented. Per block 607, the data segments may be reverse mapped from the un-packing buffer 126 to the data path cycles for the third data path. Per block 608, control bits for each cycle are re-generated. In accordance with an embodiment of the invention, the reverse mapping is performed such that the data bytes mapped to each cycle belong to a single packet. In other words, data bytes from different packets are not mapped to a same cycle. For example, in one specific implementation, the mapping of the data bytes and the re-generation of control bits may be performed so as to go from the format described above in relation to FIG. 4 to the format discussed above in relation to FIG. 2.

Per block 610, the un-packed data bytes and re-generated control bits may be provided to the third data path. This completes the communication of the data packets from the first data path to the third data path.

Figure 8:
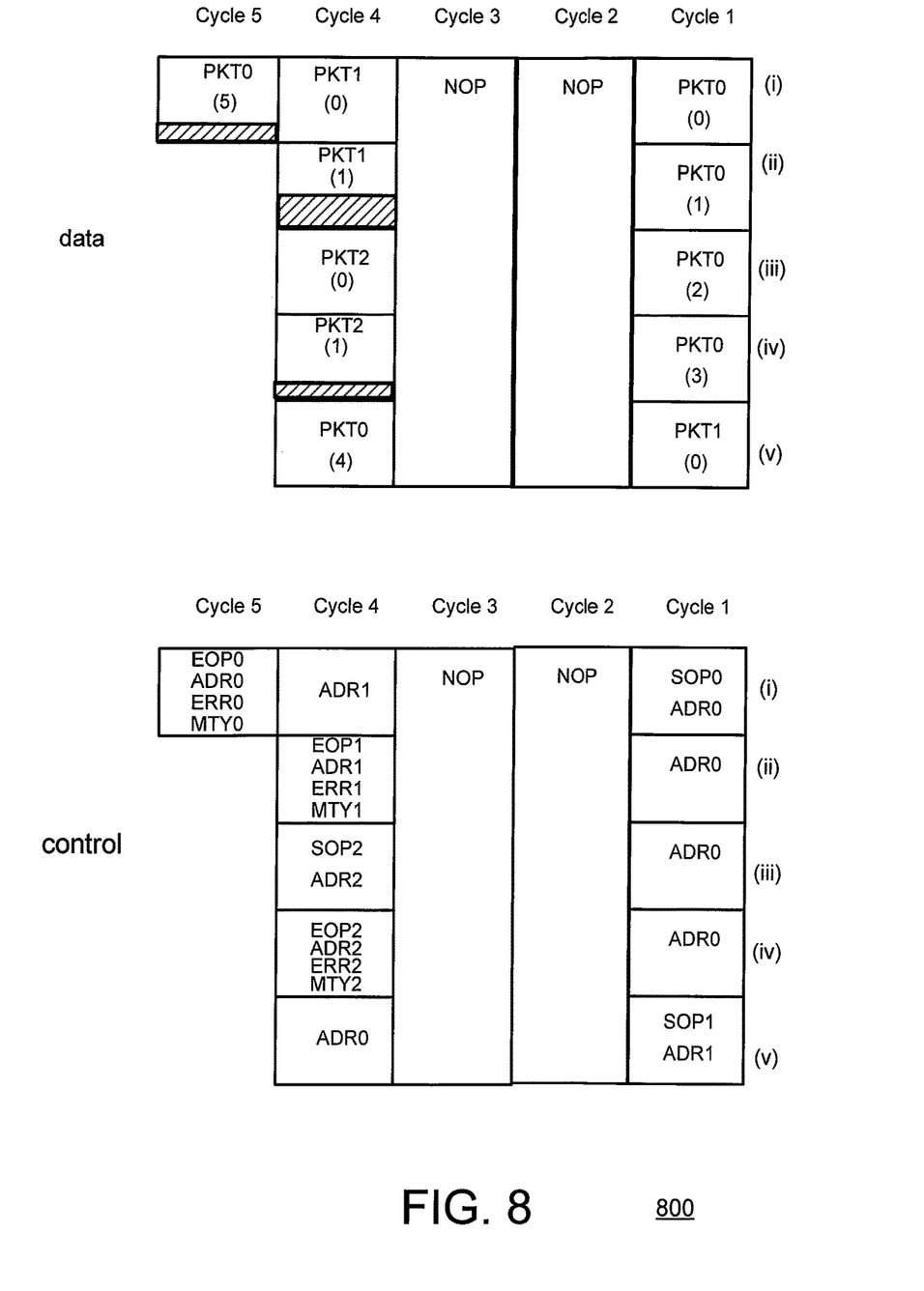
FIG. 8 depicts an exemplary intermediate packing state as generated for a second data path in accordance with an embodiment of the invention.
Figure 9:
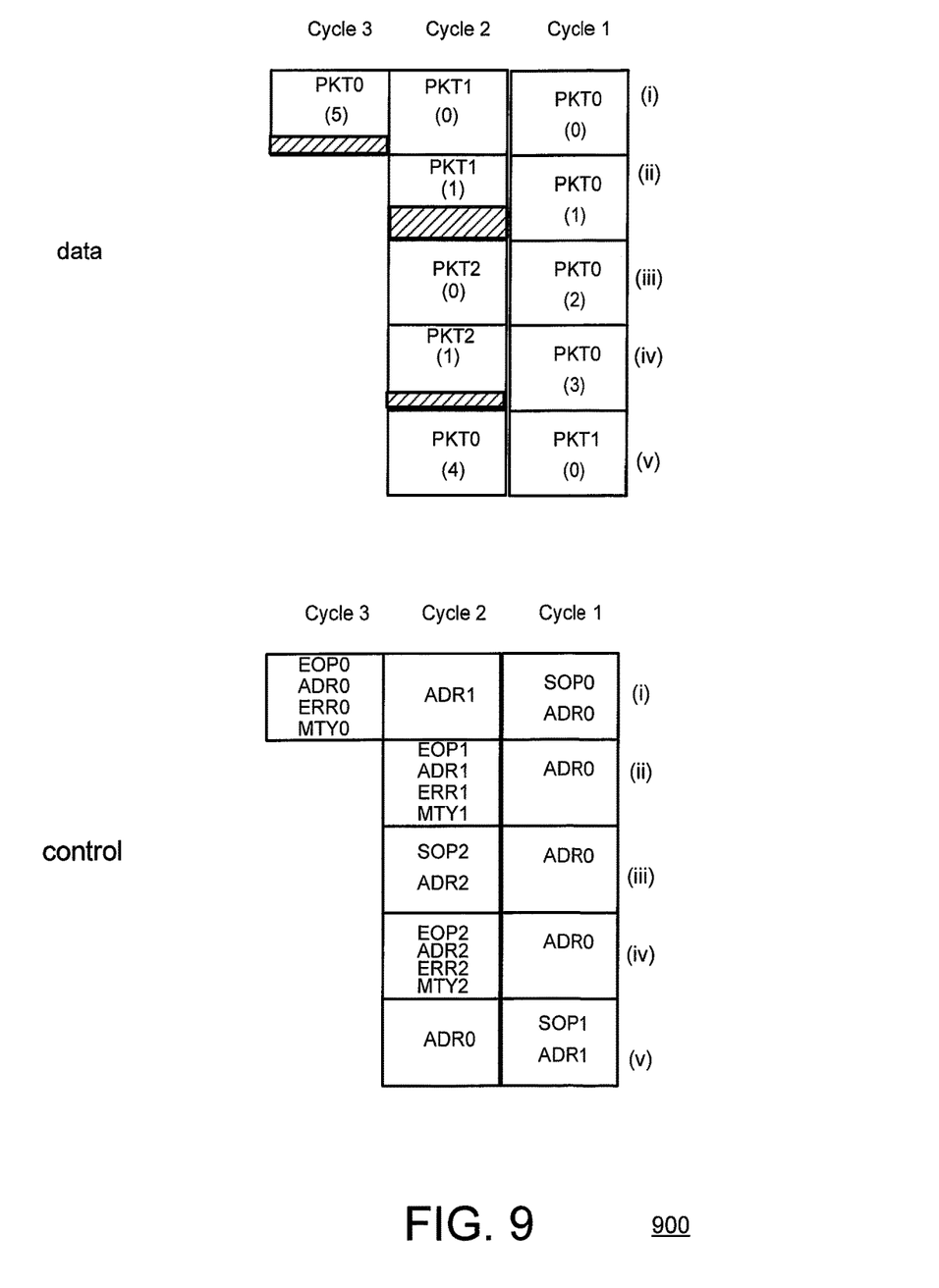
FIG. 9 depicts an exemplary final packing state to be transmitted on the second data path in accordance with an embodiment of the invention.

While FIGS. 2-4 depict an embodiment where the disclosed technique is applied to a stream of data packets, the disclosed technique may also be applied to carry data from different channels, or flows or ports. An example of such an embodiment is shown in FIGS. 7-9.

Figure 7:
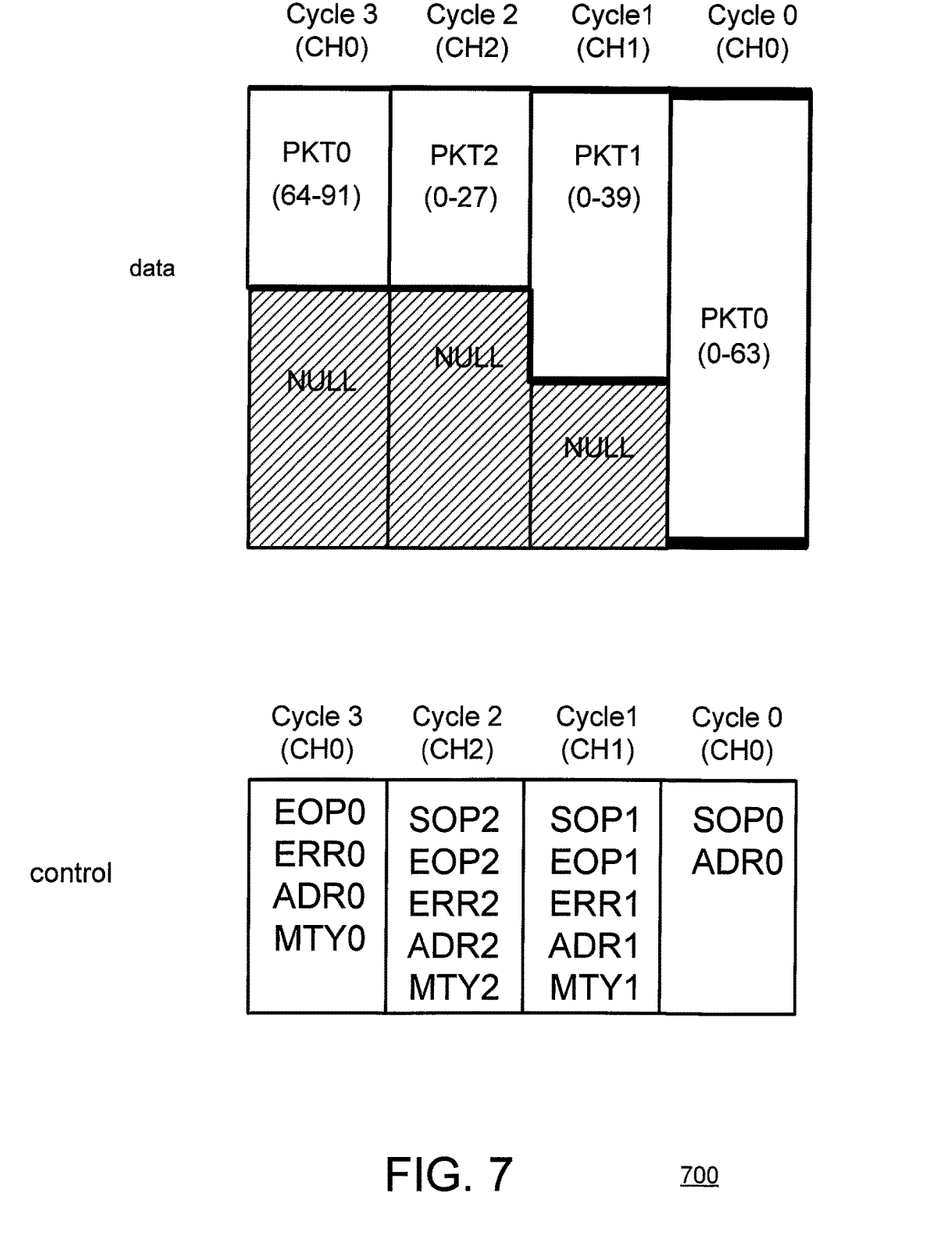
FIG. 7 is a diagram showing an example of data packets received on separate channels from a first data path in accordance with an embodiment of the invention.

FIG. 7 is a diagram showing an example of data packets received on separate channels from a first data path in accordance with an embodiment of the invention. Each channel provides a data packet flow which is separate and distinct from the data packet flows of the other channels.

In this example, there are three time-multiplexed channels: CH0, CH1, and CH2. CH0 data is received on cycles 0, 3, 6, 9, and so on. CH1 data is received on cycles 1, 4, 7, 10, and so on. CH2 data is received on cycles 2, 5, 8, 11, and so on. Note that each data packet is carried on a single channel.

The specific example depicted in FIG. 7 shows a first data packet (PKT0) received on CH0 at cycles 0 and 3, a second data packet (PKT1) received on CH1 at cycle 1, and a third data packet (PKT2) received on CH2 at cycle 2. Control bits for PKT0 are received at cycles 0 and 3, control bits for PKT1 are received at cycle 1, and control bits for PKT2 are received at cycle 2.

FIG. 8 depicts an exemplary intermediate packing state for a second data path in accordance with an embodiment of the invention. As shown, the intermediate packing state allows data from different channels to be carried during a single cycle (i.e. during a single time slot). In the specific example depicted, cycle 1 has four segments carrying data bytes and control bits for PKT0 (for CH0) and one segment carrying data bytes and control bits for PKT1 (for CH1). Cycles 2 and 3 are NOP cycles. Cycle 4 has two segments carrying data bytes and control bits for PKT1 (for CH1), two segments carrying data bytes and control bits for PKT2 (for CH2), and one segment carrying data bytes and control bits for PKT0 (for CH0). Lastly, in this example, cycle 5 has one segment carrying data bytes and control bits for PKT0 (for CH0).

FIG. 9 depicts an exemplary final packing state to be output on the second data path in accordance with an embodiment of the invention. As shown, the NOP cycles in the intermediate packing state are removed to generate the final packing state.

Figure 10:
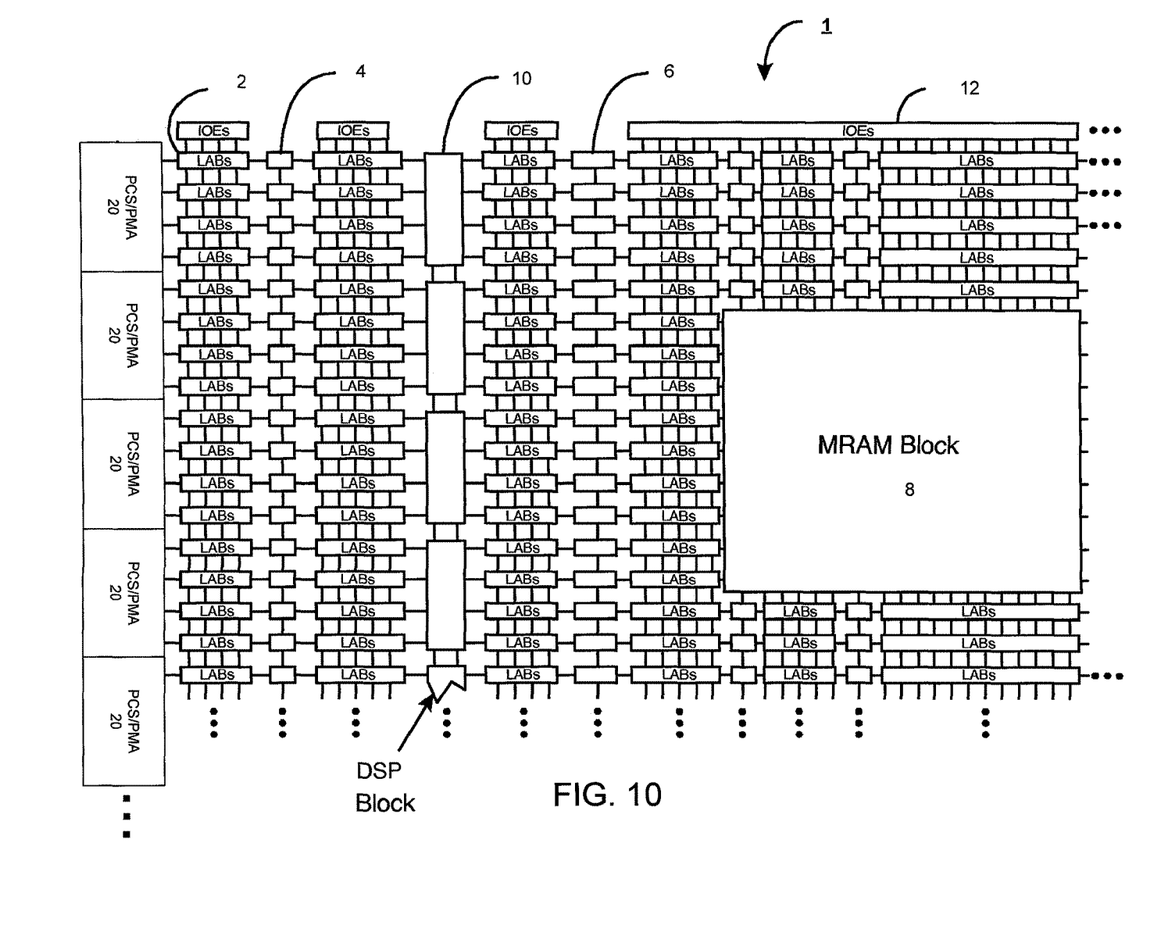
FIG. 10 is a simplified partial block diagram of a field programmable gate array (FPGA) that may be configured to implement an embodiment of the present invention.

FIG. 10 is a simplified partial block diagram of a field programmable gate array (FPGA) 1 that may be configured with circuitry to implement an embodiment of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 1 includes within its "core" a two-dimensional array of programmable logic array blocks (or LABs) 2 that are interconnected by a network of column and row interconnect conductors of varying length and speed. LABs 2 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 1 may also include a distributed memory structure including random access memory (RAM) blocks of varying sizes provided throughout the array. The RAM blocks include, for example, blocks 4, blocks 6, and block 8. These memory blocks can also include shift registers and FIFO buffers.

FPGA 1 may further include digital signal processing (DSP) blocks 10 that can implement, for example, multipliers with add or subtract features. Input/output elements (IOEs) 12 located, in this example, around the periphery of the chip support numerous single-ended and differential input/output standards. Each IOE 12 is coupled to an external terminal (i.e., a pin) of FPGA 1.

An array of PMA and PCS circuitry 20 may be included as shown, for example. The PCS circuitry generally provides digital logic functions which implement data communication protocols, while the PMA circuitry generally provides mixed (analog/digital) signal functionality for the data communications. For example, for certain protocols, the PCS circuitry may be configured to perform, among other functions, 8 bit-to-10 bit and/or 128 bit-to-130 bit encoding for data to be sent to the PMA circuitry and 10 bit-to-8 bit and/or 130 bit-to-128 bit decoding for data received from the PMA circuitry. The PMA circuitry may be configured to perform, among other functions, serialization of data to be transmitted (conversion from parallel to serial) and de-serialization of received data (conversion from serial to parallel).

A subset of the LABs 2 coupled to modules in the PMA/PCS array 20 may be configured to implement the methods and apparatus described above. Alternatively, the above-described methods and apparatus may be implemented using hardwired circuitry, or part configured LABs 2 and part hardwired circuitry.

It is to be understood that FPGA 1 is described herein for illustrative purposes only and that the present invention can be implemented in many different types of PLDs, FPGAs, and ASICs. The present invention can also be implemented in a system that has an FPGA as one of several components.

Figure 11:
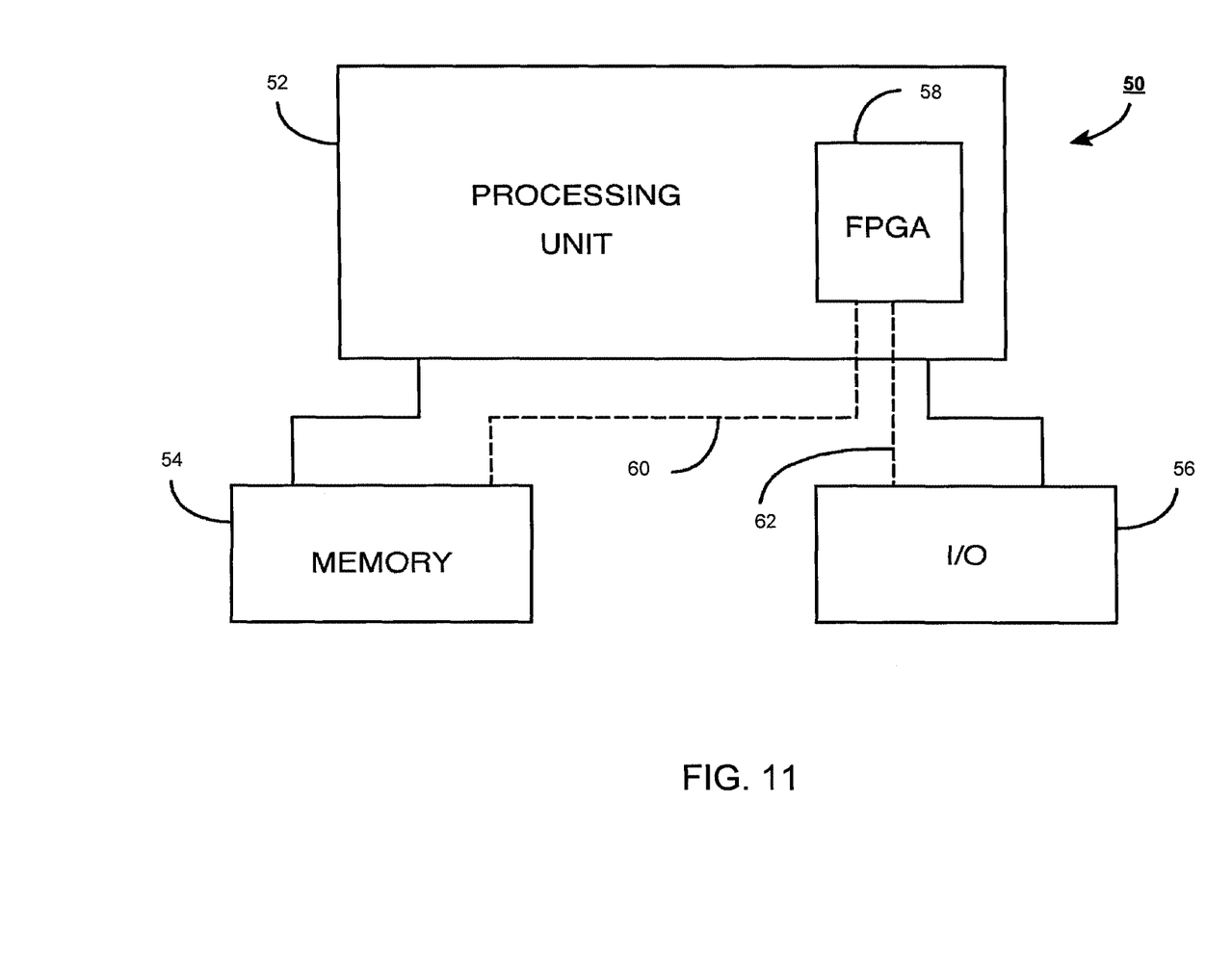
FIG. 11 shows a block diagram of an exemplary digital system that may be configured to utilize an embodiment of the present invention.

FIG. 11 shows a block diagram of an exemplary digital system 50 that can embody techniques of the present invention. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 62 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method of communicating a data packet stream in which data is re-packed, the method comprising:

receiving a stream of data packets from a first data path having a first data width, wherein data bytes received in each cycle from the first data path belong to a single data packet; and mapping the data bytes from the first data path to a second data path having a second data width that is divided into a plurality of data segments, wherein a plurality of data bytes may be mapped to each of the plurality of data segments, wherein said mapping comprises determining that, although data bytes are available to map, insufficient data bytes are available to map at least one data byte to each data segment of the plurality of data segments;

generating control bits for no-operation cycles until sufficient data bytes are available to map at least one data byte to each data segment of the plurality of data segments, and stopping the generating of control bits for no-operation cycles when at least one data byte is mapped to each data segment of the plurality of data segments; and subsequently to said mapping and generating, removing the no-operation cycles; and outputting the data bytes for transmission over the second data path after the no-operation cycles are removed, wherein the second data width differs from available to map at least one data byte to each data segment of the plurality of data segments the first data width, and wherein at least one data byte is mapped to each segment of the plurality of data segments until an end of, or pause in, the stream of data packets.

2. The method of claim 1, wherein the first data path comprises an internal data path within an integrated circuit and the second data path comprises an external data path between two integrated circuits.

3. The method of claim 1, wherein the first and second data paths both comprise internal data paths within a same integrated circuit.

4. The method of claim 1 further comprising:
receiving control bits in a first format for the first data path, wherein the control bits in the first format received in a cycle are associated with the data bytes received from the first data path in the cycle.

5. The method of claim 4, wherein the control bits in the first format include at least: a start-of-packet signal when the data bytes received from the first data path in the cycle include a first data byte of a data packet; and an end-of packet signal when the data bytes received from the first data path in the cycle includes a last data byte of the data packet.

6. The method of claim 1 further comprising:
generating control bits in a second format for the second data path.

7. The method of claim 6, wherein the control bits in the second format are grouped into control segments, each control segment being associated with a corresponding data segment of the plurality of data segments.

8. The method of claim 7 further comprising:
generating a start-of-packet signal for a control segment if the data segment associated with the control segment contains a first data byte of a data packet.

9. The method of claim 8 further comprising:
generating an end-of-packet signal for a control segment if the data segment associated with the control segment contains a last data byte of a data packet.

10. The method of claim 1, wherein the first data path has a first clock rate, the second data path has a second clock rate which differs from the first clock rate.

11. The method of claim 10, wherein the first data width is smaller than the second data width, and wherein the first clock rate is faster than the second clock rate.

12. The method of claim 1 further comprising:
transmitting the data bytes and control bits over the second data path; and
reverse mapping the data bytes from the second data path to a third data path.

13. The method of claim 12, wherein the data bytes reverse mapped to a single cycle of the third data path belong to a single data packet.

14. The method of claim 1, wherein generating control bits for the no-operation cycles ceases upon detection of an end of the stream of data packets.

15. An integrated circuit comprising:
a first interface to a first data path having a first data width from which a stream of data packets are received, wherein data bytes received in each cycle from the first data path belong to a single data packet;
a second interface to a second data path having a second data width which is divided into a plurality of data segments, wherein a plurality of data bytes may be mapped to each of the plurality of data segments, wherein the second data width differs from the first data width; and
a data re-packing circuit module that maps the data bytes from the first data path to the second data path such that at least one data byte is mapped to each data segment of the plurality of data segments until an end of, or pause in, the stream of data packets,
wherein the data re-packing circuit module determines that, although data bytes are available to map, insufficient data bytes are available to map at least one data byte to each data segment of the plurality of data segments, generates control bits for no-operation cycles until sufficient bytes are available to map at least one data byte to each data segment of the plurality of data segments, stops the generating of control bits for no-operation cycles when at least one data byte is mapped to each data segment of the plurality of data segments, and, subsequently, removes the no-operation cycles, and outputs the data bytes for transmission over the second data path after the no-operation cycles are removed.

16. The integrated circuit of claim 15, wherein the first data path comprises an internal data path within the integrated circuit and the second data path comprises an external data path between two integrated circuits.

17. The integrated circuit of claim 16, wherein the external data path comprises a multi-lane link having a plurality of serial lanes.

18. The integrated circuit of claim 15, wherein the first and second data paths both comprise internal data paths within the integrated circuit.

19. The integrated circuit of claim 15, wherein generating control bits for the no-operation cycles ceases upon detection of an end of the stream of data packets by a time-out function.

20. A transceiver for data communications over a bidirectional link, the transceiver comprising:
a transmitter which includes
an internal outgoing data path having a first data width from which an outgoing stream of data packets are received, wherein outgoing data bytes received in each cycle from the internal outgoing data path belong to a single data packet,
an interface to an external outgoing data path having a second data width which is divided into data segments, wherein a plurality of data bytes may be mapped to each of the plurality of data segments, wherein the second data width differs from the first data width, and
a data re-packing circuit module which maps the outgoing data bytes from the internal outgoing data path to the external outgoing data path such that at least one outgoing data byte is mapped to each data segment until an end of, or pause in, the outgoing stream of data packets, wherein the data re-packing circuit module, determines that, although data bytes are available to map, insufficient data bytes are available to map at least one outgoing data byte to each data segment of the external outgoing data path, generates control bits for no-operation cycles until sufficient bytes are available to map at least one data byte to each data segment of the plurality of data segments, and, subsequently, removes the no-operation cycles before outputting the outgoing data bytes to the external outgoing data path; and a receiver which includes
an interface to an external incoming data path having the second data width from which incoming data bytes for an incoming stream of data packets are received, wherein the external incoming data path is divided into data segments,
an internal incoming data path having the first data width, and
a data un-packing circuit module which reverse maps the incoming data bytes from the external incoming data path to the internal incoming data path such that the incoming data bytes mapped to each cycle belong to a single data packet.

21. A method of communicating data packets from multiple channels, the method comprising:
receiving multiple data packet flows on a first data path having a first data width, wherein data bytes received in each cycle from the first data path belong to a single data packet flow;
mapping the data bytes from the first data path to a second data path having a second data width that is divided into a plurality of data segments, wherein a plurality of data bytes may be mapped to each of the plurality of data segments, wherein said mapping comprises determining that, although data bytes are available to map, insufficient data bytes are available to map at least one data byte to each data segment of the plurality of data segments during reception of the stream of data packets;
generating control bits for no-operation cycles until sufficient bytes are available to map at least one data byte to each data segment of the plurality of data segments, and stopping the generating of control bits for no-operation cycles when at least one data byte is mapped to each data segment of the plurality of data segments; and
subsequently to said mapping and generating, outputting the data bytes for transmission over the second data path,
wherein the second data width differs from the first data width, and
wherein at least one data byte is mapped to each segment of the plurality of data segments until an end of, or pause in, the multiple data packet flows.

\* \* \* \* \*